United States Patent [19]

Lowery et al.

[11] Patent Number: 4,855,352

[45] Date of Patent: Aug. 8, 1989

[54] PROCESS FOR THE PRODUCTION OF STABLE DISPERSIONS, THE DISPERSIONS SO PRODUCED, AND THE USE THEREOF IN THE MANUFACTURE OF POLYURETHANES

[75] Inventors: Michael K. Lowery, Pittsburgh; Richard E. Keegan, McMurray; Mark A. Koshute, Beaver, all of Pa.

[73] Assignee: Mobay Corporation, Pittsburgh, Pa.

[21] Appl. No.: 225,403

[22] Filed: Jul. 28, 1988

[51] Int. Cl.$^4$ ............................................. C08L 75/04
[52] U.S. Cl. .................... 524/728; 524/729; 524/762; 524/773; 524/775; 525/452; 525/454; 525/459; 525/460
[58] Field of Search ............... 524/728, 729, 762, 773, 524/775; 525/452, 454, 459, 460

[56] References Cited

U.S. PATENT DOCUMENTS

| | | | |
|---|---|---|---|
| 3,325,421 | 6/1967 | Muller | 252/308 |
| 4,042,537 | 8/1977 | Dahm et al. | 260/2.5 |
| 4,089,835 | 5/1978 | Konig et al. | 260/31.6 |
| 4,092,275 | 5/1978 | Reischl et al. | 260/2.5 |
| 4,093,569 | 6/1978 | Reischl et al. | 260/2.5 |
| 4,119,613 | 10/1978 | Reischl et al. | 526/64 |
| 4,147,680 | 4/1979 | Reischl et al. | 260/29.2 |
| 4,184,990 | 1/1980 | Reischl et al. | 260/29.2 |
| 4,293,470 | 10/1981 | Cuscurida | 260/45.9 |
| 4,296,213 | 10/1981 | Cuscurida et al. | 521/166 |
| 4,305,857 | 12/1981 | Reischl | 260/29.2 |
| 4,305,858 | 12/1981 | Reischl | 260/29.2 |
| 4,310,448 | 1/1982 | Reischl | 260/29.6 |
| 4,310,449 | 1/1982 | Reischl | 260/29.6 |
| 4,324,716 | 4/1982 | Reischl et al. | 524/761 |
| 4,374,209 | 2/1983 | Rowlands | 521/116 |
| 4,496,678 | 1/1985 | Wenzel et al. | 524/157 |
| 4,523,025 | 6/1985 | Cuscurida et al. | 560/26 |

*Primary Examiner*—Maurice J. Welsh
*Attorney, Agent, or Firm*—Gene Harsh; Joseph C. Gil; Richard E. L. Henderson

[57] ABSTRACT

Stable finely-divided dispersions of polyureas and/or polyhydrazodicarbonamides in a hydroxyl-group-containing material are made by reacting (i) an isocyanate with (ii) a compound selected from polyamines, hydrazines, hydrazides and mixtures thereof in the presence of (iii) a hydroxyl compound selected from polyethers, polyesters, polyester amides, polycarbonates and mixtures thereof and (iv) a catalyst. The catalyst is a compound which catalyzes the reaction of isocyanate groups with hydroxyl groups. The catalyst is used in a quantity of at least 50 parts per million parts of (i), (ii) and (iii). These dispersions are particularly useful in the production of polyurethanes.

11 Claims, No Drawings

PROCESS FOR THE PRODUCTION OF STABLE DISPERSIONS, THE DISPERSIONS SO PRODUCED, AND THE USE THEREOF IN THE MANUFACTURE OF POLYURETHANES

BACKGROUND OF THE INVENTION

The present invention relates to stable dispersions of polyureas and/or polyhydrazodicarbonamides in a hydroxyl group-containing material.

Stable dispersions for use in manufacturing polyurethanes are known in the art. One particular family of such dispersions which has met with substantial commercial success are those polyureas and/or polyhydrazodicarbonamide dispersions prepared by reacting an organic polyisocyanate with (a) polyamines containing primary and/or secondary amine groups, and/or (b) hydrazines, and/or (c) hydrazides, in the presence of hydroxyl group-containing materials. See, e.g. U.S. Pat. Nos. 4,042,537 and 4,089,835. Other patents describing this type of dispersion include U.S. Pat. Nos. 3,325,421, 4,092,275, 4,093,569, 4,119,613, 4,147,680, 4,184,990, 4,293,470, 4,296,213, 4,305,857, 4,305,858, 4,310,448, 4,310,449, 4,324,716, 4,374,209, 4,496,678, and 4,523,025. While the commercially available dispersions are used to produce polyurethane products having excellent physical properties, it would be desirable if even further improvements could be realized.

The present invention is therefore directed to a novel process for producing stable dispersions, the dispersions so-produced, and their use in the manufacture of polyurethane products. These dispersions are characterized by solids of significantly smaller particle size. Foams produced from these dispersions exhibit improved load bearing properties.

DESCRIPTION OF THE INVENTION

The present invention is more particularly directed to an improved process for the production of stable dispersions of polyureas and/or polyhydrazo-dicarbonamides in a hydroxyl group-containing material. The hydroxyl group-containing material is selected from polyethers, polyesters, polyesteramides, polycarbonates and mixtures thereof. These dispersions are made by reacting (i) organic di- and/or polyisocyanates with (ii) a composition selected from (a) polyamines containing primary and/or secondary amine groups, (b) hydrazines, (c) hydrazides, and (d) mixtures thereof, in (iii) the hydroxyl-group-containing material. The reaction is conducted in the presence of a compound which is capable of catalyzing the reaction between isocyanate groups and hydroxyl groups. This catalytic compound is used in an amount of at least 50 parts by weight per million parts by weight of the combined weight of components (i), (ii) and (iii). It is preferred that the reaction components be continuously introduced into a flow mixer in quantities such that the equivalent ratio of component (i) to component (ii) is from 0.8:1 to 1.35:1. The average residence time in the mixer is less than 10 minutes. The reaction product issuing from the flow mixer is subsequently collected in a receiver.

The stable dispersions of the present invention have solids contents (in the form of polyureas and/or polyhydrazodicarbonamides) of from 1 to 35% by weight.

It has been found that by using the catalyst compound required in the present invention, the average particle size of the dispersions is significantly reduced. Foams produced from such dispersions exhibit improved load bearing characteristics.

The present invention is also directed to the stable dispersions themselves and to the use of those dispersions in producing polyurethane products either in cellular or non-cellular form.

In the reaction of the isocyanate (i) and the amine, hydrazine and/or hydrazide component (ii) in the presence of the hydroxyl-group-containing material (iii) the NCO-groups react preferentially with the NH- and/or $NH_2$-groups of component (ii). However, the OH-groups of (iii) also play a part in the reaction. The reaction of isocyanate (i) with hydroxyl-group-containing material (iii) results in the formation of polyurea and/or polyhydrazodicarbonamide chains which are chemically attached to molecules of the hydroxyl-containing material. Molecules of this type are believed to have a dispersing effect upon the resinous particles. The extent to which the OH-groups take part in the reaction is governed by the specific reaction environment. If too many hydroxy functional molecules react with the isocyanate, highly viscous dispersions are obtained. If, on the other hand, the proportion of co-reacting hydroxy functional molecules is too small, the dispersions formed may be unstable.

The presence of the catalyst compound required in the present invention does not appear to affect the amount of hydroxyl groups reacting in the present process. It is, however, possible to control the NCO/OH-reaction to such a degree that finely divided dispersions with the low viscosity required are formed. The dispersions obtained are so stable that they do not sediment even after prolonged storage and even after storage at elevated temperatures.

In preparing the dispersions of the invention, substantially any di- and/or polyisocyanate may be used. Suitable isocyanates include aliphatic, cycloaliphatic, araliphatic, aromatic and heterocyclic polyisocyanates of the type described, for example, by W. Siefken in *Justus Liebigs Annalen der Chemie*, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanto-3,3,5-trimethyl-5-isocyanatomethylcyclo-hexane (see, e.g. German Auslegeschrift No. 1,202,785 and U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and-/or -4,4'-diisocyanate; naphthylene-1,5-diisocyanate: triphenylmethane-4,4',4''-triisocyanate; polyphenyl-polymethylene-polyisocyanates of the type which may be obtained by condensing aniline with formaldehyde, followed by phosgenation, and which are described, for example, in Britich Patent Nos. 878,430 and 848,671; m- and p-isocyanatophenyl sulfonyl isocyanates of the type described in U.S. Pat. No. 3,454,606; perchlorinated aryl polyisocyanates of the type described, for example, in U.S. Pat. No. 3,227,138; polyisocyanates containing carbodiimide groups of the type described in U.S. Pat. No. 3,152,162; diisocyanates of the type described in U.S. Pat. No. 3,492,330; polyisocyanates containing allophanate groups of the type described, for example, in British Patent No. 994,890, Belgian Patent No.

761,616 and published Dutch Patent Application No. 7,102,524; polyisocyanates containing isocyanurate groups of the type described, for example, in U.S. Pat. No. 3,002,973, in German Patent Nos. 1,022,789, 1,222,067 and 1,027,394, and in German Offenlegungsschriften Nos. 1,919,034 and 2,004,048; polyisocyanates containing urea groups of the type described in German Patent No. 1,230,778; polyisocyanates containing biuret groups of the type described, for example, in German Patent No. 1,101,394, U.S. Pat. Nos. 3,124,605 and 3,201,372 and in British Patent No. 889,050; polyisocyanates obtained by telomerization reactions of the type described, for example, in U.S. Pat. No. 3,654,106; polyisocyanates containing ester groups of the type described, for example, in British Patent Nos. 965,474 and 1,072,956, in U.S. Pat. No. 3,567,763 and in German Patent No. 1,231,688; reaction products of the above-mentioned isocyanates with acetals as described in German Patent No. 1,072,385; and polyisocyanates containing polymeric fatty acid radicals of the type described in U.S. Pat. No. 3,455,883. It is also possible to use the isocyanate-group-containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use readily available polyisocyanates, such as 2,4- and 2,6-tolylene diisocyanates and mixtures of these isomers ("TDI"); polyphenyl-polymethylene-polyisocyanates of the type obtained by condensing aniline with formaldehyde, followed by phosgenation ("crude MDI"); and, polyisocyanates containing carbodiimide groups, allophanate groups, isocyanurate groups urea groups or biuret groups ("modified polyisocyanates"). TDI is the most preferred.

Component (ii) required in the present invention is a compound selected from (a) polyamines containing primary and/or secondary amine groups, (b) hydrazines, (c) hydrazides, and (d) mixtures thereof.

Suitable polyamines useful in the present invention include divalent and/or higher polyvalent, primary and/or secondary, aliphatic, araliphatic, cycloaliphatic or aromatic amines. Specific examples of suitable polyamines include ethylene diamine; 1,2- and 1,3-propylene diamine; tetramethylene diamine; hexamethylene diamine; dodecamethylene diamine; trimethyl diaminohexane; N,N'-dimethyl ethylene diamine; 2,2'-bis-aminopropyl methylamine; higher homologs of ethylene diamine such as diethylene triamine, triethylene tetramine and tetraethylene pentamine; homologs of propylene diamine such as dipropylene triamine; piperazine; N,N'-bis(aminoethyl)piperazine; triazine; 4-aminobenzylamine; 4-aminophenylethylamine; 1-amino-3,3,5-trimethyl-5-aminomethylcyclohexane; 4,4'-diaminodicyclohexylmethane and -propane; 1,4-diaminodicyclohexane; phenylene diamines; naphthylene diamines; condensates of aniline and formaldehyde; tolylene diamines; bis(aminomethyl)-benzenes and the derivatives of the above-mentioned aromatic amines which are monoalkylated on one or both nitrogen atoms. Suitable polyamines generally have molecular weights of from about 60 to about 10,000, preferably from 60 to 3000, with the molecular weight range of from 60 to 1000 being particularly preferred.

Suitable hydrazines include hydrazine itself and mono- or N,N'-disubstituted hydrazines, the substituents being, e.g., $C_1$-$C_6$-alkyl groups, cyclohexyl groups or phenyl groups. The hydrazines generally have a molecular weight of from 32 to 500. It is generally preferred to use hydrazine itself.

Specific examples of suitable hydrazines useful in the practice of the present invention include hydrazine; methyl hydrazine; ethyl hydrazine; hydrazine hydrate; propyl hydrazine; isopropyl hydrazine; n-butyl hydrazine; isobutyl hydrazine; tert-butyl hydrazine; butenyl hydrazine; dodecyl hydrazine; phenyl hydrazine; tolyl hydrazine; benzyl hydrazine; 2-phenylethyl hydrazine; cyclohexyl hydrazine; cyclopentyl hydrazine; $\beta$-cyanoethyl hydrazine, 1,2-dimethyl hydrazine; 1,2-diethyl hydrazine, 1,2-diisobutyl hydrazine; 1-butyl-2-methyl hydrazine; hydrazobenzene; 1-benzyl-2-phenyl hydrazine; oxalyl dihydrazide; semicarbazide; carbohydrazide; 4-methylsemicarbazide; 4-phenylsemicarbazide; isophthalic acid dihydrazide; $\beta$-hydrazinopropionic acid hydrazide; thiosemicarbazide; thiocarbohydrazide, aminoguanidine; 1-aminopiperazine and 1,4-diaminopiperazne.

The hydrazides useful in the present invention include the hydrazides of divalent or higher polyvalent carboxylic acid, such as carbonic acid, oxalic acid, malonic acid, succinic acid, adipic acid, sebacic acid, azelaic acid, maleic acid, fumaric acid, phthalic acid, isophthalic acid, and terephthalic acid; the esters of hydrozino-monocarboxylic acid with dihydric or higher polyhydric alcohols and phenols, such as ethanediol, 1,2-propanediol, 1,2-butanediol, 1,3-butanediol, 1,4-butanediol, hexanediol, diethylene glycol, triethylene glycol, tetraethylene glycol, dipropylene glycol, tripropylene glycol and hydroquinone; and the amides of hydrazinomonocarboxylic acid (semicarbazides) with, for example, the above-mentioned diamines and polyamines. These hydrazides generally have molecular weights of from 90 to 10,000, preferably from 90 to 3000 and, most preferably, from 90 to 1000.

The above-mentioned amines and hydrazines may be used in the form of their standard commercial-grade aqueous solutions.

The present invention makes it possible to use isocyanates and amines, hydrazines, or hydrazides with a functionality of more than two proportionately or exclusively. The reaction of compounds having such relatively high functionality in the presence of hydroxyl-group-containing materials does not result in the formation of solid or very highly viscous reaction products. Rather, such reaction results n the formation of finely divided dispersions.

Also necessary in producing the dispersions of the present invention is the hydroxyl group-containing material (iii).

Polyethers are the preferred hydroxyl group-containing material and preferably contain from 1 to 8, more preferably from 2 to 6 primary and/or secondary hydroxyl groups. The polyethers preferably have molecular weights of from 200 to 16,000 and most preferably from 500 to 12,000. Polyethers of this type may be obtained in known manner by reacting starter compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. In many cases, it is preferred to use polyethers of the type which contain predominant amounts of primary OH groups.

Suitable starter compounds for preparing polyethers containing reactive hydrogen atoms include water, methanol, ethylene glycol, 1,2- or 1,3-propylene glycol, 1,4- or 2,3-butylene glycol, 1,6-hexane diol, 1,8-octane diol, neopentyl glycol, 1,4-bis(hydroxymethyl)cyclohexane, 2-methyl-1,3-propane diol, glycerol, trimethylolpropane, 1,2,6-hexaanetriol, 1,2,4-butanetriol, trimethylolethane, pentaerythritol, mannitol, sorbitol, methylglycoside, cane sugar, phenol, isononylphenol, resorcinol, hydroquinone, 1,2,2- and 1,1,3-tris(hydroxyphenyl)ethane, ammonia, methylamine, ethylene diamine, tetra- or hexamethylenediamine, diethylene triamine, ethanolamine, diethanolamine, triethanolamine, aniline, phenylene diamine, 2,4- and 2,6-diaminotoluene and polyphenyl-polymethylene-polyamines of the type obtained by condensing aniline with formaldehyde. In addition, resin-like materials of the phenol and resol type may also be used as starters. Polyethers modified with vinyl polymers, e.g., the compounds obtained by polymerizing styrene and acrylonitrile in the presence of polyethers (U.S. Pat. Nos. 3,383,151, 3,304,273, 3,523,093 and 3,110,695 and German Patent Specification No. 1,142,536) and polybutadienes which contain OH-groups are also suitable.

Suitable polyesters containing hydroxyl groups which generally have molecular weights of from 400 to 16,000, preferably from 500 to 12,000, include reaction products of polyhydric (preferably dihydric and, optionally, trihydric) alcohols with polybasic (preferably dibasic) carboxylic acids. Instead of using free polycarboxylic acids, it is also possible to use the corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable polycaraboxylic acids include succinic acid, adipic acid, suberic acid, azelaic acid, sebacic acid, diphthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol (1,4-bis(hydroxymethyl) cyclohexane),2-methyl-1,3-propanediol, glycerol, trimethylol propane, 1,2,6-hexanetriol, 1,2,4-butane-triol, trimethylol ethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones, such as ε-caprolactam, or hydroxy carboxylic acids, such as ω-hydroxy caproic acid, may also be used.

Suitable polycarbonates containing hydroxyl groups which may be obtained, for example, by reacting diols, such as 1,3-propanedoil, 1,4-butanediol and/or 1,6-hexanediol, diethylene glycol, triethylene glycol or tetraethylene glycol, with diaryl carbonates, such as diphenyl carbonate, or with phosgene.

Suitable polyesters include the predominantly linear condensates obtained from polybasic saturated and unsaturated carboxylic acids or their anhydrides and polyhydric saturated and unsaturated amino alcohols, diamines, polyamines and mixtures thereof.

The molecular weight ranges for both the polycarbonates and polyester amides are generally from 400 to 16,000 and preferably from 500 to 12,000.

The polyaddition products dispersed in the hydroxyl-group-containing material obtained by the process of the present invention may also be modified by using monofunctional isocyanates, amines, hydrazine derivatives or ammonia. For example, the average molecular weight of the polyaddition products may be adjusted by incorporating monofunctional compounds of this type. In cases where alkanolamines with primary or secondary amino groups are used, it is possible to synthesize polyureas and polyurea polyhydrazo-dicarbonamides containing free hydroxyl groups. It is also possible to introduce other groups, such as ester groups, relatively long aliphatic radicals, tertiary amino groups and active double bonds by including correspondingly substituted monoamines or diamines and/or isocyanates in the reaction environment.

These monofunctional compounds may generally be used in an amount of up to 40 mol % and more preferably in amounts of up to 25 mol % (based on total isocyanate, amine, hydrazine and hydrazide content).

Suitable monofunctional isocyanates include alkyl isocyanates, such as methyl, ethyl, isopropyl, isobutyl, hexyl, lauryl, and stearyl isocyanate; chlorohexyl isocyanate; cyclohexyl isocyanate; phenyl isocyanate; tolyl isocyanate; 4-chlorophenyl isocyanate and diisopropylphenyl isocyanate.

Examples of suitable monoamines include: alkyl and dialkyl amines with $C_1$-$C_8$ alkyl groups; cyclo-alipharic amines, such as cyclohexvlamine and homologs thereof; aniline and N-alkyl anilines; aniline derivatives substituted on the benzene nucleus; alkanolamines, such as ethanolamine, diethanolamine, propanolamine, dipropanolamine, butanolamine and dibutanolamine; and diamines with one tertiary and one primary or secondary amino group, such as N,N-dimethyl ethylene diamine and N-methylpiperazne. Monofunctional hydrazine derivatives and hydrazides of monocarboxylic acids, hydrazine monocarboxylic acid esters of monofunctional alcohols or phenols, and semicarbazides, such as methyl, ethyl, propyl, butyl, hexyl, dodecyl, stearyl, phenyl and cyclohexyl semicarbazide may also be used.

It is also possible to include relatively low molecular weight glycols and polyols having molecular weights up to 400 in the reaction environment. Suitable low molecular weight polyols include the diols and triols known to those skilled in the polyurethane chemistry as chain extenders and crosslinkers. Examples of such glycols and polyols are 1,2- and 1,3-propylene glycol, 1,4- and 2,3-butylene glycol, 1,6-hexanediol, 1,8-octanediol, neopentyl glycol, cyclohexane dimethanol, 1-methyl-1,3-propane diol, glycerol, trimethylol propane, 1,2,6-hexane triol, 1,2,4-butane trial or trimethylol ethane. Glycols with hydrophilic character, such as ethylene glycol, diethylene glycol, triethylene glycol and dipropylene glycol are preferred. It is also possible to use compounds such as dibutylene glycol, thiodiglycol and castor oil. Ester diols corresponding to one of the following general formulas are also useful:

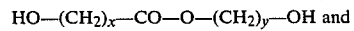

$$HO-(CH_2)_x-CO-O-(CH_2)_y-OH \text{ and}$$

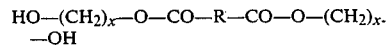

$$HO-(CH_2)_x-O-CO-R-CO-O-(CH_2)_x-OH$$

in which
- R represents an alkylene or arylene radical having from 1 to 10 carbon atoms and preferably having from 2 to 6 carbon atoms,
- x is an integer of from 2 to 6 and
- y is an integer of from 2 to 5.

Specific examples of such ester diols include δ-hydroxybutyl-ε-hydroxycaproic acid ester, ω-hydroxylexyl-γ-hydroxybutyric acid ester, adipic acid bis(β-hydroxyethyl)ester and terephthalic acid bis(β-hydroxyethyl)ester.

Diol urethanes corresponding to the following general formula are also useful:

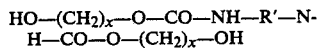

HO—(CH$_2$)$_x$—O—CO—NH—R'—NH—CO—O—(CH$_2$)$_x$—OH in which
- R' represents an alkylene, cycloalkylene or arylene radical having from 2 to 15 carbon atoms, preferably from 2 to 6 carbon atoms, and
- x is an integer of from 2 to 6.

Examples of such diol urethanes include 1,6-hexamethylene-bis(β-hydroxyethyl urethane) and 4,4'-diphenylmethane-bis(β-hydroxybutyl urethane).

Even diol ureas corresponding to the general formula are useful:

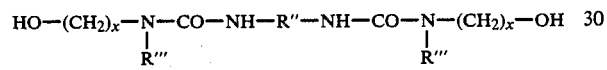

in which
- R'' represents an alkylene, cycloalkylene or arylene radical having from 2 to 15 carbon atoms, preferably from 2 to 9 carbon atoms,
- R''' reprsents H or CH$_3$ and
- x is 2 or 3.

Examples of such diol ureas include 4,4'-diphenylmethane-bis(β-hydroxyethyl urea) and the compound

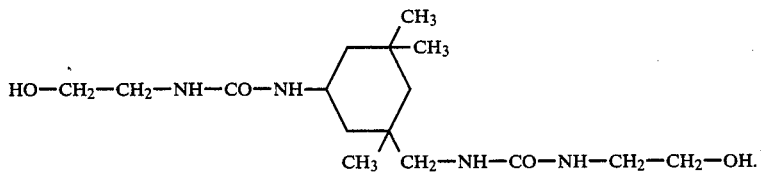

Particularly suitable low molecular weight dihydric and trihydric alcohols are those which, in admixture with the relatively high molecular weight polyesters, give a dispersant (component (iii) in the process of the present invention) which is liquid below 50° C.

The key to the present invention resides in conducting the reaction of components (i), (ii) and (iii) in the presence of a compound which is capable of catalyzing the reaction between isocyanate groups and hydroxyl groups. Compounds capable of catalyzing the reaction between isocyanate groups and hydroxyl groups are known in the art and are described for example in *Polyurethanes: Chemistry and Technology*, Vol. I, Saunders and Frisch, 1962, pages 134–173 and 208–212. Particularly useful are tertiary amines and tin compounds.

Any tertiary amine which catalyzes the reaction between isocyanates and hydroxyl-group-containing compounds is suitable for use in the present invention. These include triethylenediamine (DABCO): N-methyl-morpholine; N-ehtylmorpholine; triethylamine; N-methyldiethanolamine; N,N-diethyl- and -dimethylaminoethanol; triethanolamine; tetramethylguanidine; N,N,N',N'-tetra-methylenediamine; N,N-dimethyl(C$_{10}$-C$_{16}$-alkyl)amines; N,N-dimethylcyclohexylamine; N,N-dimethylpiperazine; 1,2,4-trimethylpiperazine; bis-(2-hydroxy-propyl)-2-methylpiperazine; bis(β-dimethylaminoethyl)-ether; tributylamine; N-cocomorpholine; N-methyl-N'-(dimethylaminoethyl)piperazine; N,N-dimethylbenzylamine; bis(N,N-diethylaminoethyl) adipate; N,N-diethylbenzylamine; pentamethyldiethylene-triamine; N,N,N', N'-tetramethyl-1,3-butanediamine; N,N-dimethyl-β-phenylethylamine; 1,2-dimethylimidazole; 2-methylimidazole; pyridine and related tertiary amines.

Any tin compound capable of catalyzing the reaction between isocyanate groups and hydroxyl groups is also useful in the practice of the present invention. Such compounds include stannous salts and dialkyl tin salts of carboxylic acids having from 1 to 18 carbon atoms, dialkyl and trialkyl tin oxides and dialkyl tin chlorides. Suitable stannous salts include stannous oleate, stannous octoate, stannous stearate and stannous acetate. These stannous salts are generally known in the art and are disclosed, for example, in U.S. Pat. Nos. 3,397,158 and 3,347,804. Suitable dialkyl tin salts include essentially any of those known and used in the art. Best results are obtained if the acid portion contains from 1 to 8 carbon atoms. The two alkyl groups may be alike or different, and may contain from 1 to 18 carbon atoms. Examples of such dialkyl tin compounds include dibutyl tin diacetate, dibutyl tin diformate, dimethyl tin adipate, dibutyl tin maleate, dipropyl tin diacetate, diethyl tin diformate, dipropyl tin dioleate, dipropyl tin dipropionate, diamyl tin dipropionate, dioctyl tin diacetate, dibutyl tin dilaurate and dibutyl tin dioctanoate. These materials are also generally known in the art and are described, for example, in U.S. Pat. Nos. 3,397,158 and 3,822,223. Trialkyl tin oxides, dialkyl tin oxides and dialkyl tin chlorides are also suitable catalysts. The alkyl groups of these compounds may contain from 1 to 18 carbon atoms. Examples of such catalysts include tributyl tin oxide, trioctyl tin oxide, dibutyl tin oxide, dipropyl tin oxide, dibutyl tin chloride, dipropyl tin chloride and diocytl tin chloride. The trialkyl tin oxides can be more accurately referred to as bis(trialkyl tin) oxides.

The most preferred catalyst is dibutyl tin dilaurate. In addition to lowering the particle size in the dispersions, dibutyl tin dilaurate also enhances the processing of polyurethane foam.

The amount of catalyst used can vary over a wide range. At least 50 parts per million parts by weight and preferably 100 parts per million parts by weight of components (i), (ii) and (iii) should be used. The upper limit is governed by economics and is generally no higher than 1000 parts per million.

The viscosity of the reaction mixture in the through-flow mixers at the reaction temperature is generally below 2000 cP, preferably below 1000 cP and most preferably in the range of from 100 to 500 cP.

The molecular weight of the products formed in dispersion in hydroxyl containing material (iii) is determined by the quantitative ratio between polyamine, hydrazine or hydrazide and any monofunctional compounds used. It is particularly preferred to react substantially equivalent quantities of isocyanates and NH-functional compounds in the hydroxyl-group-containing material. However, it is also possible to use an excess of isocyanate. In general, an NCO:NH ratio of from 0.80 to 1.35, more preferably from 0.90 to 1.05, is maintained.

The concentration of the polyaddition products in the hydroxyl-group-containing material may vary within wide limits, although it is generally from 1 to 45% by weight, more preferably from 20 to 30% by weight.

In general, the reaction components are introduced into a flow mixer of the type generally known in the art at room temperature. If desired, the hydroxyl containing material may be introduced at a slightly elevated temperature (for example 40° to 50° C.) to reduce the viscosity for ease of pumping and more efficient mixing. The reaction temperature may rise to from 50° to 150° C. Under the effect of the shear forces generated in cases where a dynamic mixer is used and under the effect of the heat generated by the polyaddition reaction depending upon the quantity of resinous solids). In general, however, it is best to keep the temperature below 110° C. (optionally by cooling the mixer) because at higher temperatures any water which may be present evaporates and can give rise to disturbances as a result of bubble formation. Where hydrazine is used, it is important to ensure that the decomposition temperature of hydrazine is not exceeded.

The polyaddition reaction of polyisocyanates with polyamines, hydrazines and/or hydrazides can be carried out in higher-performance continuous flow mixers with average residence times of from about 1 second up to 10 minutes, preferably from 2 seconds to 3 minutes. The homogenization or dispersion time should not exceed 10% of the average residence time if thorough admixture of the components is to be obtained. It is possible, although not essential, to arrange two or even more flow mixers one behind the other. The times given above then apply to the mixer system as a whole.

Flow mixers are known and divided into two groups, namely static mixers with fixed fittings and dynamic mixers with movable fittings operating on the rotor-stator principle. They may optionally be heated or cooled. In the case of static mixers, the mixing energy required is applied through pumps, whereas in the case of dynamic mixers a separate motor drives the rotor.

In every case, the dispersing effect and the particle size in the dispersion is governed by the energy applied, the shear forces correspondingly generated, and the catalysts present.

Static mixers may be divided into the following types: (a) mixers with simple fittings (see e.g., U.S. Pat. No. 3,286,992, German Offenlegungsschrift 2,119,293 and U.S. Pat. No. 3,704,006); (b) multi-channel mixers (for example, the AMK-Ross-ISG Mixers manufactured by Aachener Misch-und Knetmaschinen-Fabrik, West Germany); (c) so-called packing mixers, for example, the static mixers manufactured by Sulzer AG (Winterthur, Switzerland) and the BKM-Mixers manufactured by Bayer AG (West Germany) (See e.g., U.S. Pat. No. 3,785,620 and German Offenlegungsschrift 2,328,795 which corresponds to U.S. Ser. No. 474,836); and (d) mixing nozzles, for example, those manufactured by the Lechler Company (Stuttgart, West Germany) and the mixing chambers in the HK-machines manufactured by the Hennecke Company (Birlinghofen, West Germany) into which the starting products are injected under high pressure (counter-current injection).

Dynamic mixers suitable for use in the process of the present invention include the flow mixers manufactured by the companies Ekato RMT (Schopfheim, West Germany), Lightnin (Neu-Isenburg, West Germany) and Hennecke (toothed stirrer) which, like the known impeller-type homogenizing machines, operate on the stator-rotor principle but cannot be used to perform feed or delivery functions.

The energy required to produce the dispersions of the present invention is generally from 1 to more than 10 kW per liter of mixer volume. The amount of energy is however dependent upon the required particle size, the type of mixer used and the viscosity of the starting materials.

Where anhydrous amines, hydrazines and/or hydrazides are used, there is no need for any further treatment of the dispersion on completion of the polyaddition reactions. However, where aqueous amines (for example, aqueous ethylene diamine solution or hydrazine hydrate) are used, it may be advisable to remove the water from the dispersion in vacuo.

In general, the process of the present invention is carried out by introducing the four components (i.e. hydroxyl-group-containing material, NH-component, isocyanate, and catalyst) from separate supply vessels through metering pumps into the flow mixer in which they are thoroughly mixed and in which, at the same time, most of the polyaddition reaction takes place. However, it is also possible to combine the amine component, the hydroxyl-group-containing component and catalyst before introduction into the flow mixer. Where aqueous amines are used, the end products may be freed in vacuo from the water present in them.

The dispersions prepared by the process according to the invention may be processed into soft, semi-hard and hard polyurethane foams with improved properties, such as increased tensile strength and elongation. These dispersions are also suitable for the production of elastomers, coverings and coatings based on polyurethanes. Polyurethane products from the dispersions can be made in substantially any manner known in the art.

The polyurethane-forming reaction components (i.e., the dispersions of the present invention, isocyanate, and any other materials such as catalysts, blowing agents, and the like) may be reacted by the known one-state process, by the prepolymer process or by the semi-prepolymer process. Machines such as those described in U.S. Pat. No. 2,764,565 may be used in many of these processes. Particulars of the processing machines which may also be used to produce polyurethanes in accordance with the invention may be found in *Kunststoff-Handbuch*, Vol. VII, Vieweg and Hochtlen, Carl-Hanser-Verlag, Munich 1966, pages 121 to 205.

Foams produced from the dispersions of the present invention may be produced by introducing the reaction mixture into a mold. Suitable mold materials include metals (for example, aluminum) or plastics (for example, epoxide resin). In the mold, the foamable reaction mixture foams and forms the molding. In-mold foaming may be carried out in such a way that the molding has a compact skin and a cellular core. It is possible to introduce into the mold a quantity of foamable reaction mixture such that the foam formed just fills the mold. It is also possible to introduce into the mold more foamable reaction mixture than is required to fill the interior of the mold with foam. This latter technique is know as "over-charging" and is described, for example, in U.S. Pat. Nos. 3,178,490 and 3,182,104.

In many cases "external release agents" such as silicone oils, are used during in-mold foaming. However, it is also possible to use so-called "internal release agents", optionally in admixture with external release agents, as known, for example, from German Offenlegungsschriften 2,121,670 and 2,307,589.

Cold-hardening foams may also be produced in accordance with the invention. See British Patent 1,162,517 and German Offenlegungsschrift 2,153,086.

It is further possible to produce foams by block foaming or by the known double conveyor belt process.

The foams produced in accordance with the present invention may be used, for example, as upholstery materials, mattresses, packaging materials, shock-absorbing motor-vehicle components, films for laminating purposes and as insulating materials. The highly flexible foams produced by the process according to the invention are particularly suitable for flame lamination with films, woven fabrics and knitted fabrics of natural and synthetic materials. Films of these foams may also be effectively welded by high-frequency and ultrasonic welding. The hard polyurethane foams produced are also suitable for the production of articles with an integral structure or for the production of sandwich elements. The foams may either be produced by the in-mold foaming process or may be obtained by fabrication from block-foamed materials. They may be processed by deep-drawing, stamping or hot-forming.

The invention is further illustrated, but is not intended to be limited by the following examples in which all parts and percentages are by weight unless otherwise specified.

EXAMPLES

The polyether polyol used in each of the following Examples 1-15 was a glycerine-started polyether of propylene oxide and ethylene oxide with an OH number of 35 and a primary OH group content of approximately 80% based on the total OH content of the polyether.

The isocyanate used in each of the following examples was tolylene diisocyanate containing 80% 2,4-isomer and 20% 2,6-isomer.

EXAMPLE 1

36.3 g of dibutyltin dilaurate were added with stirring to 800 pounds of the polyether polyol in a 300 gallon vessel (100 ppm catalyst based on polyether).

2872 g/min of this polyether-catalyst mixture and 243 g/min of hydrazine hydrate (64% hydrazine) were separately pumped into a first static mixer (diameter=12.5 mm; length=155 mm; number of elements=6). At the same time, 1128 g/min of the polyether-catalyst mixture and 853 g/min of isocyanate were separately pumped into a second static mixer identical to the first static mixer. The mixtures formed in the two static mixers were then brought together in a toothed stirrer (chamber volume=500 ml; 5000 rpm). The dispersion formed in this stirrer was delivered to a post reactor where it was stirred for 30 min. at 80°-100° C. and subsquently dewatered in vacuo. A stable, white finely divided dispersion having a solids content of 20%, an OH number of 28, a particle size of 0.34 microns, and a viscosity of 3200 cPs at 25° C. was obtained.

EXAMPLES 2-15

The procedure and materials used in each of Examples 2 to 15 were the same as those used in Example 1. The relative quantities of the reactants and the physical properties of the resultant dispersions are given in TABLE 1.

TABLE 1

| Ex. No. | Total Feed rate (g/min) | | | Catalyst (ppm) | Mixer Temp(°C.) |
|---|---|---|---|---|---|
| | Iso-cyanate | Polyether Polyol | Hydrazine Hydrate | | |
| 2 | 834 | 3944 | 243 | 0 | 136 |
| 3 | 819 | 3560 | 235.5 | 100 | 140-141 |
| 4 | 569 | 3884 | 181.6 | 0 | 120-126 |
| 5 | 561 | 3820 | 179 | 100 | 123 |
| 6 | 581 | 3884 | 168.9 | 0 | 124 |
| 7 | 569 | 3820 | 162 | 100 | 123-126 |
| 8 | 586.9 | 3884 | 153.3 | 0 | 121 |
| 9 | 577 | 3820 | 151 | 100 | 123-124 |
| 10 | 407.5 | 4320 | 117.7 | 0 | 110-111 |
| 11 | 403.4 | 4320 | 116 | 100 | 114-115 |
| 12 | 413.6 | 4320 | 107.9 | 0 | 113-114 |
| 13 | 411.6 | 4320 | 107.2 | 100 | 111 |
| 14 | 413.6 | 4320 | 99 | 0 | 109 |
| 15 | 413.6 | 4320 | 99 | 100 | 110 |

| Ex. No. | Dispersion % Solids | NCO/NH Ratio | Viscosity (cPs) (@ 25° C.) | Particle Size (microns) |
|---|---|---|---|---|
| 2 | 20 | 1.0 | 4,080 | 0.75 |
| 3 | 20 | 1.0 | 4,890 | 0.34 |
| 4 | 15 | 0.9 | 2,000 | 0.88 |
| 5 | 15 | 0.9 | 1,890 | 0.35 |
| 6 | 15 | 1.0 | 2,500 | 0.54 |
| 7 | 15 | 1.0 | 2,690 | 0.25 |
| 8 | 15 | 1.1 | 6,780 | 0.46 |
| 9 | 15 | 1.1 | 6,340 | 0.22 |
| 10 | 10 | 1.0 | 2,000 | 0.38 |
| 11 | 10 | 1.0 | 1,790 | 0.23 |
| 12 | 10 | 1.1 | 2,680 | 0.36 |
| 13 | 10 | 1.1 | 3,270 | 0.19 |
| 14 | 10 | 1.2 | 7,640 | 0.36 |
| 15 | 10 | 1.2 | 6,430 | 0.19 |

EXAMPLES 16-29

Foams were made from each of the dispersions described in Table 1 using the formulations listed below.

| | Component | Parts by weight | Parts by weight |
|---|---|---|---|
| (a) | Dispersions of Exs. 1-15 | 40 | 85 |
| (b) | Polyether polyol | 60 | 15 |
| (c) | Water | 3.0 | 3.0 |
| (d) | Polycat 77 | 0.3 | 0.3 |
| (e) | Niax A-107 | 0.15 | 0.15 |
| (f) | Niax A-4 | 0.1 | 0.1 |
| (g) | L-5307 | 1.5 | 1.5 |
| (h) | T-12 | 0.02 | 0.02 |
| (i) | 75/25 TD-80/polymeric MDI | 38.9 | 38.9 |

(a) Stable dispersions of Examples 1-15 in a glycerine-started polyether polyol of polypropylene oxide in ethylene oxide with an OH number of 35 and a primary OH group content of approximately 80% (based on total OH content of polyether).

(b) A glycerine started polyether polyol of polypropylene oxide and ethylene oxide with an OH number of 28 and a primary OH group content of approximately 80% (based on a total OH content of polyether).

(d) N,N-bis(N',N'-dimethylaminopropyl)methylamine, a tertiary amine catalyst available from Air Products, Inc.

(e) A formate salt of bis($\beta$-dimethylaminoethyl) ether, a tertiary amine catalyst available from Union Carbide Corp.

(f) A tertiary amine catalyst available from Union Carbide Corp.

(g) Dimethylpolysiloxane polyalkylene oxide copolymer foam stabilizer available from Union Carbide Corp.

(h) Dibutyltin dilaurate catalyst available from Air Products, Inc.

(i) A 75/25 mixture of polyisocyanates Mondur TD-80 (80/20 mixture of 2,4 and 2,6-toluene diisocyanate isomers, available from Mobay Corporation) and Mondur E-531 (polyphenyl-polymethylene-polyisocyanates of the type obtained by condensing aniline with formaldehyde, followed by phosgenation, available from Mobay Corporation).

Foams were prepared by first pre-mixing components (a) through (h) and then adding component (i) to the pre-mix according to the ratio mentioned above. The reaction mixture was dispensed into a 10 in.×9 in.×3.5 in. aluminum mold which had been heated to a temperature of about 57°-60° C. The reaction mixture foamed to take the form of the mold, at which time the mold with reaction mixture was placed in an oven set to a temperature of about 120° C. After eight minutes the finished foam was removed from the mold and physically crushed so as to ensure that all cells were opened. The foams were further post cured at room temperature for seven days before hardness testing (ILD, 50R). The hardness results of these foams are given in TABLE 2.

TABLE 2
FOAM AND PROPERTIES

| Ex. No. | Ex. No. of Dispersion Used | % Solids Foam | ILD |
|---|---|---|---|
| 16 | 2 | 17.0 | 285 |
| 17 | 3 | 17.0 | 298 |
| 18 | 4 | 12.75 | 226 |
| 19 | 5 | 12.75 | 270 |
| 20 | 6 | 12.75 | 264 |
| 21 | 7 | 12.75 | 305 |
| 22 | 8 | 12.75 | 277 |
| 23 | 9 | 12.75 | 314 |
| 24 | 10 | 8.5 | 201 |
| 25 | 11 | 8.5 | 209 |
| 26 | 12 | 8.5 | 216 |
| 27 | 13 | 8.5 | 237 |
| 28 | 14 | 8.5 | 211 |
| 29 | 15 | 8.5 | 224 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a stable finely divided dispersion of a polyurea and/or polyhydrazodicarbonamide in a hydroxyl-group-containing material comprising reacting
   (i) an organic di- and/or polyisocyanate with
   (ii) a composition selected from the group consisting of polyamines, hydrazines, hydrazides and mixtures thereof, in
   (iii) the hydroxyl-group-containing material which is selected from the group consisting of polyethers, polyesters, polyester amides, polycarbonates and mixtures thereof,
in the presence of
   (iv) a catalyst compound that can catalyze the reaction of isocyanate groups with hydroxyl groups, wherein at least 50 parts by weight of said catalyst compound is used for every million parts by weight of the combined weight of components (i), (ii) and (iii).

2. The process of claim 1 in which isocyanate (i) is tolylene diisocyanate.

3. The process of claim 1 in which compound (ii) is a hydrazine.

4. The process of claim 1 in which the hydroxyl material (iii) is a polyether polyol.

5. The process of claim 1 in which the catalyst compound (iv) is selected from the group consisting of tertiary amine, stannous salts, dialkyl tin salts of carboxylic acids having from 1 to 18 carbon atoms, dialkyl tin oxides, trialkyl tin oxides and dialkyl tin chlorides.

6. The process of claim 5 in which the catalyst compound (iv) is dibutyl tin dilaurate.

7. A process according to claim 1 for the production of a polyurea and/or polyhydrazodicarbonamide in a hydroxyl-group-containing material comprising reacting
   (i) tolylene diisocyanate with
   (ii) a hydrazine in
   (iii) a polyether polyol,
in the presence of
   (iv) dibutyl tin dilaurate, wherein at least 50 parts by weight of dibutyl tin dilaurate is used for every million parts by weight of the combined weight of components (i), (ii) and (iii).

8. The dispersion produced by the process of claim 1.

9. The dispersion produced by the process of claim 7.

10. A process for the production of a polyurethane in which the dispersion of claim 8 is reacted with a polyisocyanate.

11. A process for the production of a polyurethane in which the dispersion of claim 9 is reacted with a polyisocyanate.

* * * * *